(No Model.)

A. C. McLACHLAN & J. CONNOR.
FAUCET FILTER.

No. 261,014. Patented July 11, 1882.

UNITED STATES PATENT OFFICE.

ARTHUR C. McLACHLAN AND JOHN CONNOR, OF BUFFALO, NEW YORK.

FAUCET-FILTER.

SPECIFICATION forming part of Letters Patent No. 261,014, dated July 11, 1882.

Application filed April 19, 1882. (No model.)

*To all whom it may concern:*

Be it known that we, ARTHUR C. McLACHLAN and JOHN CONNOR, both of the city of Buffalo, in the county of Erie and State of New York, have invented a new and useful Improvement in Faucet-Filters, of which the following is a specification.

This invention relates more particularly to that class of filters which are applied to the discharge-nozzles of faucets for the purpose of freeing the water from its impurities.

The object of our invention is the construction of a simple filter of this character, which can be readily attached to the faucet, and which is easily cleaned when necessary; and our invention consists of the particular construction of the filter, as hereinafter fully set forth.

Figure 1:
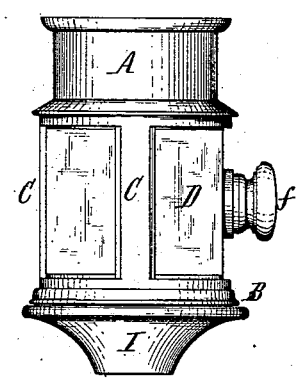
Figure 2:
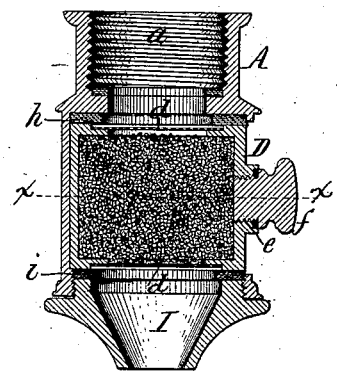
Figure 6:
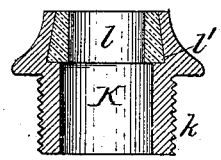
Figure 3:
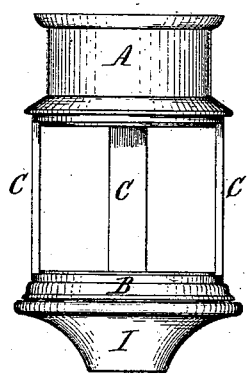
Figure 4:
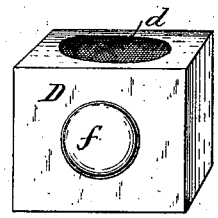
Figure 5:
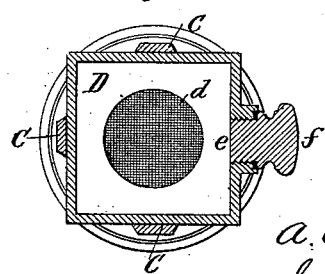

In the accompanying drawings, Figure 1 is a side elevation, and Fig. 2 a vertical section, of our improved filter. Fig. 3 is a front elevation of the filter-case with the filter removed therefrom. Fig. 4 is a perspective view of the filter proper. Fig. 5 is a horizontal section in line $x$ $x$, Fig. 2. Fig. 6 is a vertical section of a coupling which is employed for attaching the filter to a faucet which is not provided with a screw-thread.

Like letters of reference refer to like parts in the several figures.

A represents the upper sleeve or collar of the filter-casing provided with an internal screw-thread, $a$, for attaching the filter to a faucet which is provided with an external screw-thread or hose-bib.

B represents the lower ring of the filter-casing, connected with the upper sleeve, A, by upright bars C, which latter are so arranged that they form three sides of a rectangular casing, and leave an opening at the fourth side for the insertion and removal of the filter proper, D, as clearly shown in Fig. 5.

The filter D consists of a square or rectangular box, provided in its upper and lower sides with openings $d$ for the passage of the water through the filter. The openings $d$ are protected by wire-gauze or perforated metal, which is soldered or otherwise secured to the filter. The filter D is filled with pulverized charcoal or similar material, which is introduced through an opening, $e$, located in the side of the filter and closed by a screw-plug, $f$.

$h$ represents a washer, of rubber or leather, placed between the upper side of the filter D and the lower end of the sleeve A to form a water-tight joint between these parts.

I represents a screw-sleeve, which is screwed into the lower ring, B, of the casing, and which bears against the lower side of the filter D, a washer, $i$, of rubber or leather, being interposed between these parts to form a water-tight joint.

The filter being secured to the nozzle of the faucet by the screw-thread $a$, the water passes through the sleeve A, enters the filter proper through the upper opening $d$, percolates through the filtering material, and escapes from the filter through the lower opening, $d$, and the hollow sleeve I. In its passage through the filtering material the water is deprived of its impurities, which are deposited principally in the upper stratum of the filtering material.

When the operation of the filter becomes impaired from an accumulation of impurities therein, the screw-sleeve I is removed, whereby the filter is released. The latter is now drawn out of the case and replaced in the same in a reversed position, so that the stratum of filtering material which is filled with impurities is placed at the bottom. The water flowing through the same dislodges and carries off the accumulated impurities in a very short time, thereby restoring the filter to its former working condition.

K, Fig. 6, represents a coupling, which is employed to attach the filter to a faucet which is not provided with a screw-thread. This coupling is provided with an exterior screw-thread, $k$, whereby it is secured in the threaded sleeve A of the filter-case, and with a rubber ring, $l$, which is seated in an undercut recess, $l'$, formed in the upper portion of the coupling. The opening in the ring $l$ is made somewhat smaller than the cylindrical nozzle of the faucet, so that upon forcing this ring on the nozzle of the faucet the friction of the rubber ring will hold the filter on the same with sufficient tenacity to prevent the filter from becoming detached by the pressure of the water.

We claim as our invention—

1. The combination, with the filter D, having openings $d$ $d$ in its top and bottom, of a case provided in its side with an opening for inserting and removing the filter laterally, a sleeve, I, for securing the filter in the case, and means whereby the filter can be secured to the faucet, substantially as set forth.

2. The combination, with a case provided with a screw-thread, $a$, threaded ring B, and connecting-bars C, forming an opening in the side of the case, of the filter D, provided with openings $d$ $d$ in its top and bottom, and a threaded sleeve, I, for securing the filter in the case, substantially as set forth.

3. The combination, with the filter D, of the case A, having a screw-thread, $a$, and the coupling K, constructed with an undercut annular recess, $l'$, and elastic ring $l$, seated in said recess, substantially as set forth.

ARTHUR C. McLACHLAN.
JOHN CONNOR.

Witnesses:
JNO. J. BONNER,
CHAS. F. GEYER.